US007582237B2

(12) United States Patent
Sakata et al.

(10) Patent No.: US 7,582,237 B2
(45) Date of Patent: Sep. 1, 2009

(54) PROCESS FOR PREPARING GRANULAR UREA PRODUCT

(75) Inventors: Eiji Sakata, Chiba (JP); Genshi Nishikawa, Chiba (JP); Haruyuki Morikawa, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 195 days.

(21) Appl. No.: 11/484,167

(22) Filed: Jul. 11, 2006

(65) Prior Publication Data

US 2007/0013092 A1 Jan. 18, 2007

(30) Foreign Application Priority Data

Jul. 13, 2005 (JP) ............................ 2005-203811

(51) Int. Cl.
*C05C 9/00* (2006.01)
*B29B 9/00* (2006.01)

(52) U.S. Cl. .......................... 264/7; 23/313 FB; 71/28; 264/14

(58) Field of Classification Search ..................... 71/28; 264/7, 14; 23/313 FB
See application file for complete search history.

(56) References Cited

U.S. PATENT DOCUMENTS 3,475,132 A 10/1969 Seifert et al.
4,217,127 A * 8/1980 Kono et al. .................... 71/28
4,219,589 A * 8/1980 Niks et al. .................. 427/213
4,525,198 A * 6/1985 Van Hijfte et al. ............ 71/28
4,619,843 A 10/1986 Mutsers
4,749,595 A 6/1988 Honda et al.
5,547,486 A * 8/1996 Detrick et al. ................. 71/28
5,653,781 A * 8/1997 Kayaert et al. ................. 71/28
7,498,055 B2 * 3/2009 Mutsers ...................... 427/213

FOREIGN PATENT DOCUMENTS

FR 2 393 779 1/1979
JP 4-63729 10/1992
JP 10-216499 8/1998
WO WO 2005/007619 A1 1/2005

OTHER PUBLICATIONS

Urea Granulation, "Coming of Age", Nitrogen & Methanol No. 272, Nov.-Dec. 2004, pp. 37-43.
"Granulate in fluid bed", by J.P. Bruynseels, Hydrocarbon Processing, Sep. 1981, pp. 203-208.

* cited by examiner

*Primary Examiner*—Wayne Langel
(74) *Attorney, Agent, or Firm*—Flynn, Thiel, Boutell & Tanis, P.C.

(57) ABSTRACT

In a granulating process for preparing granular urea from an aqueous urea solution using a fluidized bed method or a fluidized, spouted bed method, an aqueous urea solution having a urea concentration of 94-98.5 wt % is used and the operational temperature of the fluidized bed is controlled in a range of 110-120° C. to accelerate the drying of a granulated product to thereby give a granular urea product having a moisture content of 0.3 wt % or less.

4 Claims, 1 Drawing Sheet

PROCESS FOR PREPARING GRANULAR UREA PRODUCT

TECHNICAL FIELD

The present invention relates to a process for preparing granular urea from an aqueous urea solution, wherein it relates to a process for preparing a product having a high product strength by sufficiently lowering the moisture content in a granular urea product.

RELATED ARTS

With regard to a process for preparing relatively large-sized granular urea, in old times, there were a method using a drum and a method using a dish type granulator. However, these methods had such drawbacks that: in granulating the urea, the solidification heat of the urea was released and a recycle operation was required in which granulated urea was returned to a granulator after being cooled so that a granulator had to be operated under an interior temperature condition appropriate to granulation; the recycle required a large facility; one granulator had limitations in the production quantity; plural granulators had to be installed for a recent industrial scale; and urea sprayed into a granulator was a molten urea with the same moisture content as that in a product.

Therefore, recently, granulating processes employing a fluidized bed or a fluidized, spouted bed has become mainstream and various techniques have been proposed in these granulating processes.

JP-B 4-63729 proposes a method for preparing granular urea by scattering a spouted bed in a fluidized bed and supplying a coating material for grains as fine drops to process grains in the bed. Specifically, it proposes a urea granulating method that defines the thickness of a fluidized bed, space for grains to be processed to rise and fall, spraying angle for a coating material, spouting velocity and flow volume of air for forming a spouted bed, an arranging method of the spouted bed, and the like. In this urea granulating method, since the solidification heat of the urea is removed by an air flow forming a spouted, fluidized bed, granulated and cooled granular urea is not required to be returned again to a granulator, whereby a granulating facility is simplified. In addition, there is a merit that the granulator makes the production possible by one plant irrespective of the production scale.

Further, JP-A 10-216499 proposes a process that further improves the fluidized, spouted bed method proposed in JP-B 4-63729. Specifically, it discloses that, when carrying out granulation by using a granulator constituted of a granulation section, an air-supplying pipe for spouting air into the granulation section, a nozzle for ejecting a stock liquid arranged at the center portion of the air-supplying pipe outlet, a bottom floor in which a fluid flows, and an upper supply port for supplying air for fluidization to the bottom floor, and ejecting a molten stock liquid or a stock liquid into a slurry from the nozzle for ejecting a stock liquid to the granulation section, by setting (a) the distance between the air-supplying pipes to be 100 to 1000 mm, (b) the ejection angle of the nozzle for ejecting a stock liquid to be 30 to 60 degrees, (c) the ejection volume of the nozzle for ejecting a stock liquid to be 0.5 to 1.2 litters per 1 $m^3$ of air volume at the air-supplying pipe outlet, (d) the linear velocity at the air-supplying pipe outlet to be 1.2 to 3.5 times the terminal velocity of an average granule, and (e) the linear velocity of air supplied to the bottom floor in which granulated products are fluidized to be 1.2 to 3.5 times the minimum fluidizing velocity, a stabilized fluidized bed and a spouted bed are formed, a product containing no deformed product can be prepared, and the air consumption by a granulator, including the bed portion and an air-supplying pipe, can be reduced to achieve a significant energy saving effect.

In JP-B 56-47181, there is proposed a process for achieving granulation by spraying an aqueous urea solution, using a nozzle that sprays it together with air, on urea nuclei fluidized in a form of fine droplets, that is, droplets having an average diameter of 20 to 120 μm, and at such a temperature that water is evaporated from the solution sprayed on the nuclei and crystallizes urea on the nuclei to form a granulated product having a desired dimension. It is described that, in this process, the created granules are subjected to a drying treatment with air at 100 to 150° C. to keep the temperature of the granules at 70 to 90° C. in order to remove moisture on their surface.

In Nitrogen & Methanol November-December 2004 pp 37-43, a urea granulation technique of Stamicarbon Company is presented. The process is a granulating process characterized by a film-spraying nozzle. There are such descriptions that urea as a stock to be sent to a granulator is made into a 98.5 wt % aqueous urea solution, and operation is carried out while adjusting the temperature of the fluidized bed at about 105° C. The moisture content of the granular urea prepared by the method is described as 0.3 wt % or less without a specific value. Further, there is no description about product quality when a urea liquid having a concentration of 98.5 wt % or less is used as a stock.

Generally, in order to further concentrate an aqueous urea solution of 95 wt %, the addition of a relevant concentrating system, a condenser for evaporating water and a vacuum generator, is necessary, which requires a heavy investment. Therefore, use of a urea solution with a lower urea concentration as a stock is better. Further, in a granulator, heat is generated when the urea solidifies, which must be removed. The removal of the heat is often carried out with air and in a generally used granulator employing a fluidized bed, a urea solution with a lower urea concentration can remove the heat through the evaporation of water to make it possible to reduce the volume of air necessary for a fluidized bed.

DISCLOSURE OF THE INVENTION

The background art is a process and a facility for preparing granular urea from a molten urea as a stock by using a granulator constituted of a fluidized, spouted bed. There is no specific citation about the moisture concentration in the product prepared there and, in JP-A 10-216499, although there is a description about the role of air for a jet flow of an air-supplying pipe that it solidifies a molten product to granulate it and, at the same time, removes moisture contained in the molten product to dry it, and that drying is carried out in a jet flow section, there is no citation about the effect. Generally, with regard to the product quality of granular urea, important items are the total nitrogen content, biuret as an impurity and moisture content. Generally, a moisture content of 0.3 wt % or less is a standard value and a designed value of a urea product at the shipment thereof. Products with a moisture content of 0.3 wt % or more are sometimes marketed, actually. However, a high moisture content in urea lowers the product hardness to result in heavy abrasion in instruments that handle the product and an increase in the generation of urea dust, or, during storage in a warehouse, the moisture evaporates and comes into contact with cold ambient air to wet the surface of the urea product, which leads to the agglomeration of urea grains with each other to form a large agglomerate, whereby it may become in such a condition that does not allow it to be taken out as a finished product. Thus, a moisture content as low as possible is desirable and, in particular, when handling a granular urea product granulated by utilizing a fluidized bed, that of 0.3 wt % or less is preferred.

Since a granulator utilizing a fluidized bed has a drying effect, an aqueous urea solution of 94-95 wt % or more is often used as a stock. However, some granulators may result in a moisture content of 0.3 wt % or more in a prepared product when starting from a stock of 94-95 wt %. On this occasion, the concentration of a stock urea solution must be increased to 98-99.7 wt %, instead of a 94-95 wt % aqueous urea solution, to assist the drying effect so that the moisture content in the product is 0.3 wt % or less. However, although the heat generated when urea agglomerates is removed by air sent to a granulator and evaporation heat resulting from the evaporation of water in an aqueous urea solution, when the concentration of an aqueous urea solution is increased, the evaporation heat of water decreases to increase the volume of air for cooling and the capacity of a blower, which is not preferred because the power consumption necessary for granulation is increased and the production cost is pushed up.

Some granulators employ such a process that an aqueous urea solution is sprayed while introducing air of a high temperature into a nozzle for spraying to carry out granulation while drying fine aqueous urea solution particles. In this process, however, it is required to increase the air pressure to a pressure necessary for spraying an aqueous urea solution, in general to 1 to 2 bar, which requires a considerable motive energy for increasing the air pressure and is not economical.

The solidification heat of urea is removed by air in a fluidized bed, however, since the agglomeration temperature of urea is about 132° C., a low temperature in a granulator results in the formation of granular urea agglomerates having a so-called confetto-like shape formed by the sticking of urea grains while using a sprayed urea as a binder because the agglomeration on the urea grain surface is fast, which is not preferable. Accordingly, a granulator is often operated at a low temperature in a range that does not cause the above-described problem, that is, at 95-105°, because urea grains leaving the granulator are cooled. On the other hand, with regard to operation under elevated temperatures, since there are concerns about miscarrying in urea granulation in a granulator at a temperature too close to an agglomeration temperature, the temperature of a fluidized bed is not elevated beyond the above-described value.

Figure 1:
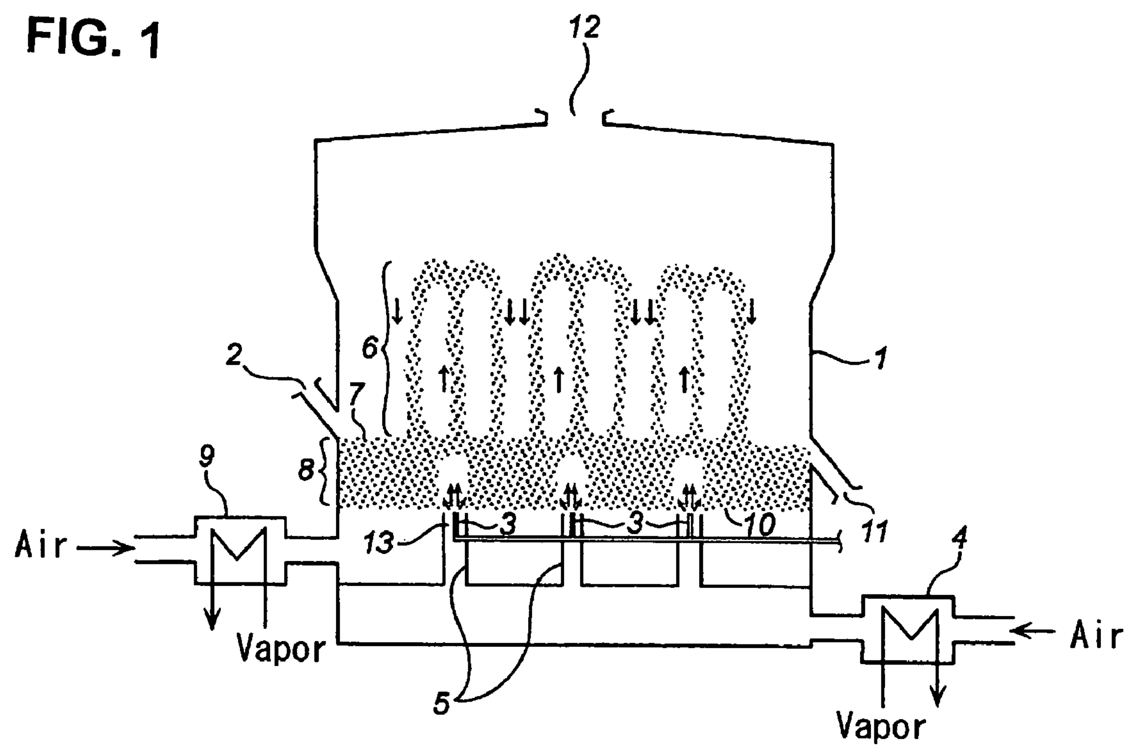
FIG. 1 is a cross-sectional view of an embodiment of a granulator of the fluidized, spouted bed method as one example of the present invention.

Further, in the diagram, the code 1 means a granulator, 2 means a seed grain-supplying port, 3 means a nozzle, 4 means an air heater for a spouted bed, 5 means an air-supplying pipe, 6 means a space, 7 means an upper portion of a fluidized bed, 8 means a fluidized bed, 9 means an air heater for a fluidized bed, 10 means a bottom floor, 11 means a granule discharge port, 12 means an exhaust port and 13 means an upper portion of an air-supplying pipe.

The present invention provides a process for decreasing the moisture content in a product to 0.3 wt % or less when an aqueous urea solution is used as a stock solution in a granulator utilizing a fluidized bed.

The present invention has been achieved by the following means.

The present invention is a process for preparing a granular urea product having a moisture content of 0.3 wt % or less, which comprises the steps of feeding an aqueous urea solution having a urea concentration of 94-98.5 wt % into a granulator employing a fluidized bed or a fluidized and spouted bed, and granulating at an operational temperature of the fluidized bed of 110-120° C., while accelerating the drying of a granulated product.

In other words, the invention is a granulating process for preparing a granular urea product from an aqueous urea solution by using a granulator employing a fluidized bed or a fluidized, spouted bed, wherein an aqueous urea solution having a urea concentration of 94-98.5 wt % is used and an operational temperature of the fluidized bed is controlled in a range of 110-120° C. to accelerate the drying of a granulated product, thereby giving a granular urea product having a moisture content of 0.3 wt % or less in the product.

More specifically, it is a process, in a granulating process using a granulator constituted of an air-supplying pipe for ejecting air into a fluidized bed fluidizing a granulated product, a nozzle for ejecting a stock urea solution arranged at the center portion of the pipe, and a porous plate for supplying fluidizing air to the fluidized bed, and carrying out granulation by ejecting the urea solution from the nozzle for ejecting a stock urea solution into a granulation section, wherein an aqueous urea solution with a urea concentration of 94-98.5 wt % is used and the operational temperature of the fluidized bed is controlled in a range of 110-120° C. to accelerate the drying of the granulated product to give a granular urea product with a moisture content of 0.3 wt % or less.

Further, the process is also effective in a process for carrying out granulation using a granulator in which a stock urea solution is sprayed into a fluidized bed that is fluidizing a granulated product while introducing compressed air into a nozzle for ejecting the stock urea solution, thereby solidifying and granulating urea on the granulate in the fluidized bed. That is, although a moisture concentration in a product was affected by the volume of a compressed air and spraying performance of a spray, by operating a fluidized bed in a temperature range of 110-120° C., it becomes possible to stably give a product with a moisture content of 0.3 wt % or less without the above-described effect.

In addition, the present inventors discovered that a slight increase in the temperature of a fluidized bed has no effect on urea granulation, and that an elevated temperature makes it possible to manufacture a granulated product with a lowered moisture content in the urea product and a high hardness. However, the drying effect in the fluidized bed is not effective when the temperature of the fluidized bed becomes less than 110° C., because the moisture content of the granules at the granulator outlet exceeds 0.3 wt %. In a range of up to 120° C., a higher fluidized bed temperature has a larger drying effect, but above 120° C., a urea solution drop adhering to the urea grain surface does not instantly solidify on the surface and requires some time to solidify. Since a granular urea that has solidified slowly has a low strength and wears in a solid handling instrument to generate powder, continuous operation of a granulating facility becomes impossible. Thus, the temperature must be kept at 120° C. or less.

According to the present invention, it is possible to prepare a granular urea constantly having a moisture concentration of 0.3 wt % or less in the product. Since the moisture content is low, it is a granular urea having a large granule load strength and being nonbreakable, it hardly breaks in an instrument and warehouse handling of the product and generates little dust.

Hereinafter, as an example of embodiments of the present invention, an example according to a fluidized, spouted bed granulator (FIG. 1) in which a spouted bed is arranged to a fluidized bed is described. But, needless to say, the present invention can be applied to a granulator employing a fluidized bed.

FIG. 1 is a cross-sectional view of an example of a fluidized, spouted bed granulator.

To a granulator 1, a seed grain for urea to be granulated is supplied from supply port 2. A urea solution is sprayed into the granulator 1 from spray nozzle 3 located at an upper outlet 13 of air-supplying pipe 5 for a spouted bed. The seed grains grow in grain diameter by receiving the spray of the urea solution within the granulator 1, which rises into space 6 by a spouting air flow heated by air heater 4 for the spouted bed, is introduced into a lower portion of the granulator, and split by plural air-supplying pipes 5, and then falls again on the upper portion 7 of the fluidized bed. Through air heater 9 for the fluidized bed, air for the fluidized bed is supplied to the granulator 1, granular urea having grown on the bottom floor 10 is in a fluidized state in fluidized bed section 8, and the granular urea is fluidized so as to fill the whole space above the nozzle 3. This movement is repeated, the granular urea gradually grows, and, finally, the completely granulated granular urea is discharged from vent 11.

Urea is granulated by using the granulator 1, wherein, as described above, the granulation is practiced in the granulator by the cooling and solidifying of a urea solution stuck to a seed grain, and the cooling is practiced with air for the spouted bed and air for the fluidized bed. The temperature of the fluidized bed changes depending on the production volume, air volume, urea solution concentration and temperature of the air for the fluidized bed. In particular, since atmospheric air is used as the air for the fluidized bed, the temperature thereof is affected by the atmospheric air temperature. Further, the amount of the evaporation heat of the water contained in a urea solution changes depending on the concentration of the solution, and a lower concentration requires more heat for evaporation to lower the temperature of the fluidized bed. Therefore, the air for the fluidized bed is heated with the air heater 9 for the fluidized bed and introduced into the granulator 1 to stabilize the temperature of the fluidized bed section 8 at 110-120° C. irrespective of the ambient temperature and concentration of a stock aqueous urea solution. As a result, the moisture content contained in the product can be maintained at 0.3 wt % or less.

In a granulating process characterized by using a film-spraying nozzle, the process of the present invention can decrease the moisture content in the product by increasing the fluidized bed temperature, even when the stock urea concentration sent to the granulator is 98.5 wt % or less.

EXAMPLES

Next, the present invention shall be described in further detail based on Examples. However, needless to say, the present invention is not limited only to these examples.

Example 1

Figure 2:
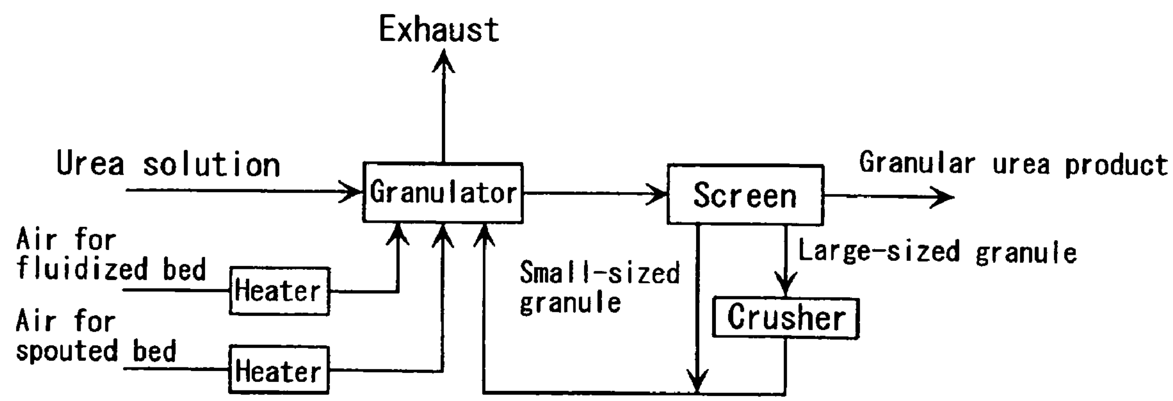
FIG. 2 is a general flow diagram for preparing granular urea by using a granulator.

By using a fluidized, spouted bed granulator, 41.7 ton/h of granular urea is produced. The flow is shown in FIG. 2.

48 air-supplying pipes were prepared and, at the upside of respective air-supplying pipes, a spray nozzle for spraying a stock urea solution was disposed. From the supply port 2, a seed grain was sent to start operation and 0.943 ton/h of a 95 wt % aqueous urea solution was sprayed from each of the spray nozzles, which corresponded to 45.26 ton/h in total for the granulator, to prepare granular urea. At that time, 95,800 $Nm^3$/h of air at 35° C. was sent to the fluidized bed so that the air had a velocity of 2 m/s. On the other hand, the total 25,700 $Nm^3$ of air having been heated up to 130° C. by the air heater 4 for the spouted bed to the 48 air-supplying pipes. The granular urea from the granulator discharge port 11 was cooled down to 90° C., which was then classified with a screen to give granular urea having a 2-4 mm product size as a urea product, followed by cooling to a product temperature of 50° C. to be sent to a warehouse. Among the granules lying outside the product size, larger ones were crashed with a crasher after cooling down to 70° C., and smaller ones were returned directly to the granulator as the seed grain. In the operation, the temperature of the fluidized bed 8 was 104° C. As the result of the operation, 68.85 ton/h of granular urea was discharged at 105° C. from the granulator discharge port 11, which was passed through a screen to give 41.7 ton/h of 2-4 mm urea product to be sent to a warehouse. On the other hand, 27.15 ton/h of granular urea separated by the screen was returned to the granulator as the seed grain, as mentioned above.

The difference in urea amount between the sum of 27.15 ton/h returned to the granulator as the seed grain and urea in the stock aqueous urea solution, and the granular urea amount discharged from the granulator, was discharged as dust from an upside air discharge port of the granulator 1 together with the air for the fluidized bed, the air for the spouted bed and evaporated water in the urea granulation. The discharged gas containing the urea dust was washed in an exhaust gas-cleaning tower with a circulating liquid. The urea was collected as an aqueous urea solution and returned to a urea factory. The moisture contained in the product was in the range of 0.35-0.4 wt % and the load strength of the granular urea with a size of 3 mm in diameter was 2.5-3 kg.

Consequently, in the above-described operational state, the fluidized bed temperature was gradually increased by heating the air for the fluidized bed. When it exceeded 110° C., the moisture content in the product tended to fall to below 0.3 wt %. By further heating the air for the fluidized bed up to 55° C., the fluidized bed temperature was raised up to 115° C. As a result, the moisture content in the obtained granular urea was lowered to 0.2-0.25 wt % and the load strength of granular urea with a size of 3 mm in diameter also increased to 3.5-4 kg.

Further, when the air for the fluidized bed was heated to raise the fluidized bed temperature up to 121° C., clogging at the screen by urea powder and plugging in a chute for solid handling occurred, which did not allow the facility to continue the operation. It is thought that, since the fluidized bed temperature was high, the sprayed aqueous urea solution solidified slowly on the grain surface and since the thus prepared granular urea had a low strength under a rather high temperature condition, wear thereof occurred in the solid handling instrument to generate powders.

Example 2

In the same operational state as in Example 1, a urea solution of 98 wt % in concentration was used to practice granulation. At that time, the temperature of the air for the fluidized bed was 38° C. Since the urea solution contained a small amount of water, the temperature of the fluidized bed increased and was 115° C. during operation even when the temperature of the air for the fluidized bed was 38° C. The moisture content contained in a product at that time lowered to 0.2-0.25 wt %. The load strength of granular urea with a 3 mm diameter was 3.5-4 kg. Then, since the ambient air temperature was lowered to 25° C., the fluidized bed temperature lowered to 106° C. The moisture content in a product at that time increased up to 0.35-0.4 wt %. Accordingly, the temperature of the air for the fluidized bed was raised up to 38° C. to result in a fluidized bed temperature of 115° C. for the purpose of making the moisture content be 0.3 wt % or less, whereby the moisture content in the product decreased to 0.2-0.25 wt % to produce a granular urea having a diameter of 3 mm and load strength of 3.5-4 kg.

Example 3

In the same flow as in Example 1, a granulator, which sprays into a fluidized bed fluidizing a granulated product by introducing compressed air into a nozzle for spraying a stock urea solution and solidifies urea on the granulated product in the fluidized bed, was used.

144 two-fluid spray nozzles for spraying a urea solution by introducing compressed air into a nozzle for spraying a stock urea solution were disposed. A seed grain was sent from the supply port 2 to start operation, and 0.314 ton/h of a 95 wt % aqueous urea solution was sprayed from each spray nozzle, that is, 45.22 ton/h total for the granulator, to prepare granular urea. To the 144 spray nozzles, 23,040 $Nm^3$ in total of air heated up to 130° C. by the air heater 4 were sent. At that time, 95,800 $Nm^3$/h of air at 35° C. was sent to the fluidized bed so as to have an air velocity of 2 m/s. Granular urea from the granulator discharge port 11 was cooled down to 90° C., from which granular urea having a product size of 2-4 mm was then classified with a screen as an urea product, which was cooled down to a product temperature of 50° C. and then sent to a warehouse. Among the granules lying outside the product size, the larger ones were crashed with a crasher after being cooled down to 70° C. and the smaller ones were returned directly to the granulator as the seed grain. In operation, the temperature of the fluidized bed 8 was 104° C. As a result of the operation, 68.79 ton/h of granular urea was discharged at 105° C. from the granulator discharge port 11, which was passed through a screen to give 41.6 ton/h of 2-4 mm urea product to be sent to a warehouse. On the other hand, 27.19 ton/h of granular urea separated by the screen was returned to the granulator as the seed grain, as mentioned above.

The difference in urea amount between the sum of 27.13 ton/h returned to the granulator as the seed grain and urea in the stock aqueous urea solution, and the granular urea amount discharged from the granulator, was discharged as dust from an upper air discharge port of the granulator 1 with the air for the fluidized bed, the air for the two-fluid spray nozzle and evaporated water in the urea granulation. The discharged gas containing the urea dust was washed in an exhaust gas-cleaning tower with a circulating liquid. The urea was collected as an aqueous urea solution and returned to a urea factory. The moisture content of the product was in a range of 0.3-0.35 wt % and the load strength of granular urea with a size of 3 mm in diameter was 3-3.5 kg.

Consequently, in the above-described operational state, the fluidized bed temperature was gradually increased by heating the air for the fluidized bed. When it exceeded 110° C., the moisture content in the product tended to fall below 0.3 wt %. By further heating the air for fluidization, the fluidized bed temperature was raised up to 115° C. As a result, the moisture content in the obtained granular urea was lowered to 0.2-0.25 wt % and the load strength of the granular urea with a size of 3 mm in diameter also increased to 3.5-4 kg.

Further, when the air for the fluidized bed was heated to raise the fluidized bed temperature up to 121° C., the same state as in Example 1 resulted and the operation was stopped.

Example 4

The two-fluid nozzle in Example 3 was replaced by a two-fluid nozzle that sprays a urea solution in a liquid film of an inverted cone shape (Hollow Cone) and the operation was practiced under the same conditions as in Example 3. The moisture contained in a product prepared by the process was in a range of 0.35-0.4 wt % and the load strength of the granular urea with a size of 3 mm in diameter was 2.5-3 kg. In the above-described operational state, the fluidized bed temperature was gradually increased by heating the air for the fluidized bed. When it exceeded 110° C., the moisture content in the product was measured to give a value of below 0.3 wt %. By further heating the air for the fluidized bed, the fluidized bed temperature was raised up to 115° C. The same result as in Example 1 was obtained, that is, the moisture content of the obtained granular urea lowered to 0.2-0.25 wt % and the load strength of the granular urea with a size of 3 mm in diameter also increased to 3.5-4 kg.

Further, when the air for the fluidized bed was heated to raise the fluidized bed temperature up to 121° C., the same state as in Example 1 resulted and the operation was stopped.

The invention claimed is:

1. A process for preparing a granular urea product having a moisture content of no more than 0.3 wt. %, comprising the steps of:

employing a fluidized and spouting bed method in a granulator in which an air-supplying pipe injects air into a granulated product in the granulator to form both a fluidized bed and a spouting bed;

ejecting an aqueous urea solution having a urea concentration of 94-98.5 wt. % into the granulator from a nozzle arranged at the center of the pipe;

supplying air for fluidization to the fluidized and spouting bed through a porous plate; and performing granulation at an operational temperature of from 115-120° C. in the fluidized and spouting bed to accelerate drying of a granulated product.

2. The process of claim 1, wherein the air injected from the air-supplying pipe is preheated by an air heater.

3. The process of claim 2, wherein the air is preheated to a temperature of 130° C. by the air heater.

4. A process for preparing a granular urea product having a moisture content of no more than 0.3 wt. %, comprising the steps of:

employing a fluidized and spouting bed method in which an air-supplying pipe injects air which has been preheated by an air heater to a temperature of up to 130° C. into a granulated product in the granulator to form both a fluidized bed and a spouting bed;

ejecting an aqueous urea solution having a urea concentration of 94-98.5 wt. % into the granulator from a nozzle arranged at the center of the pipe;

supplying air for fluidization to the fluidized and spouting bed through a porous plate; and performing granulation at an operational temperature of from 115-120° C. in the fluidized and spouting bed to accelerate drying of a granulated product.

* * * * *